June 1, 1965 R. C. ULM ETAL 3,186,578
STORAGE TANK
Filed Jan. 12, 1961 3 Sheets-Sheet 1

INVENTORS
REIGN C. ULM AND
ROBERT W. BODLEY
BY Byron, Hume, Groen and Clement
ATTORNEYS

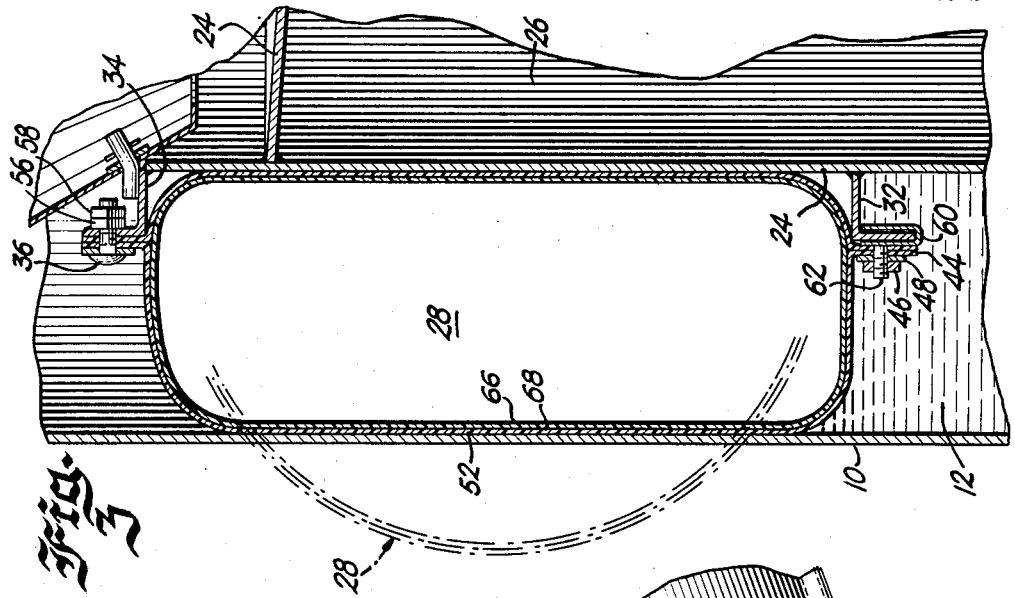
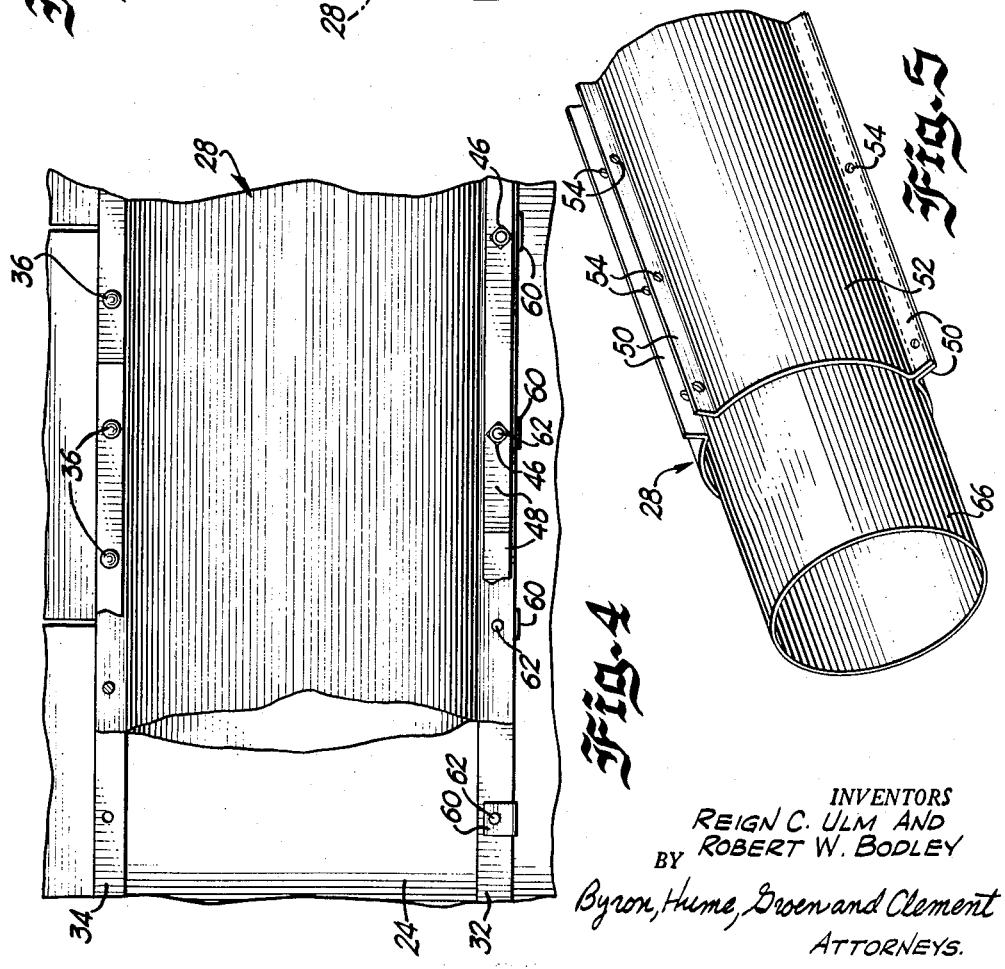

June 1, 1965  R. C. ULM ETAL  3,186,578
STORAGE TANK
Filed Jan. 12, 1961  3 Sheets-Sheet 3
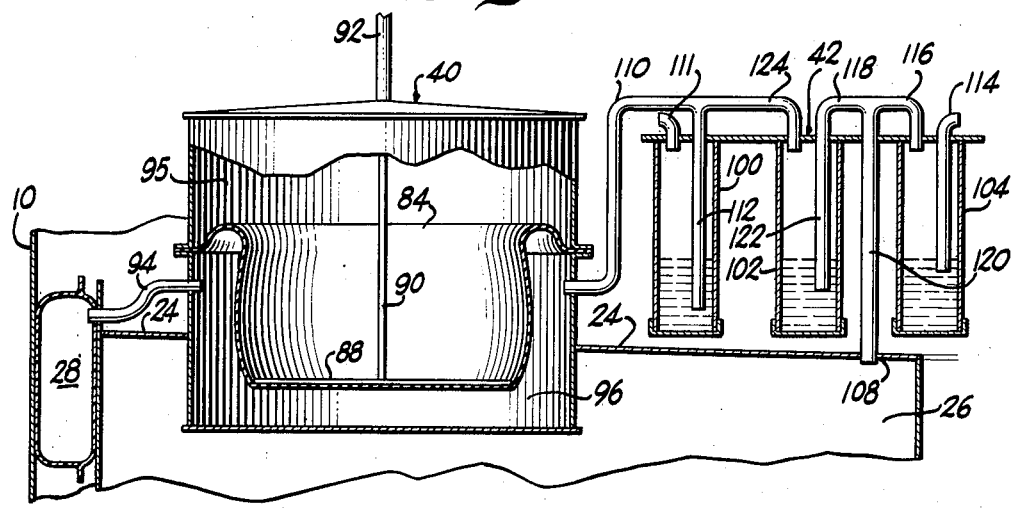
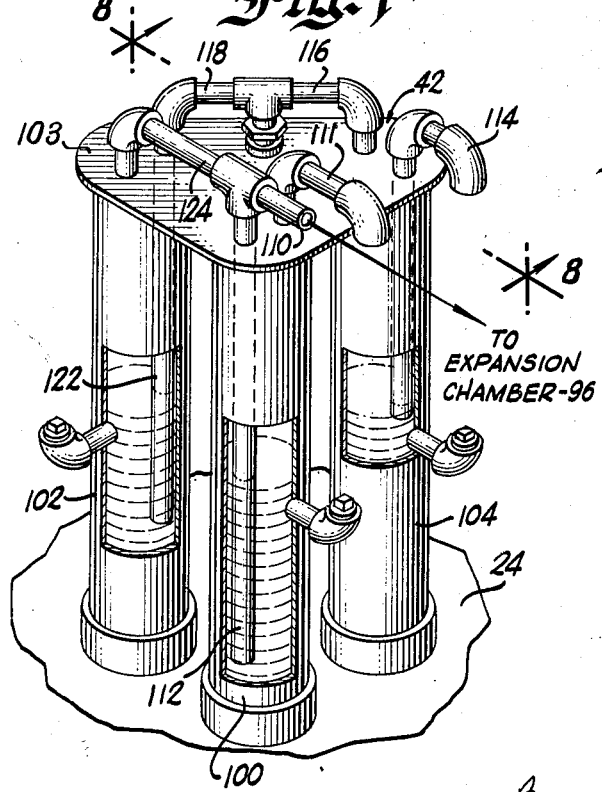
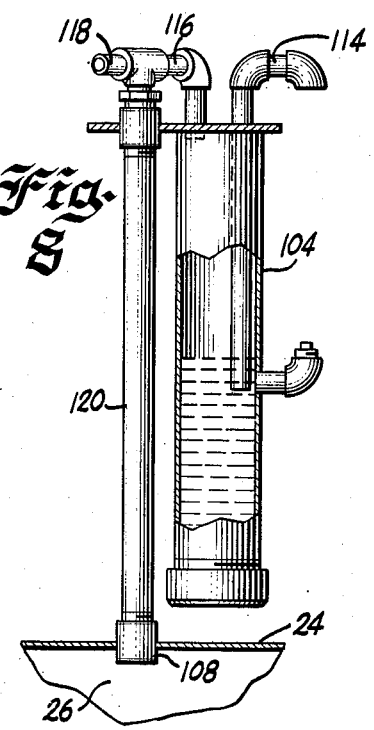
INVENTORS
REIGN C. ULM AND
ROBERT W. BODLEY
BY Byron, Hume, Groen and Clement
ATTORNEYS United States Patent Office 3,186,578
Patented June 1, 1965

3,186,578
STORAGE TANK
Reign C. Ulm, Schererville, and Robert W. Bodley, Highland, Ind., assignors to Union Tank Car Company, Chicago, Ill., a corporation of New Jersey
Filed Jan. 12, 1961, Ser. No. 82,248
1 Claim. (Cl. 220—26)

The present invention relates to storage tanks and, in particular, to sealing arrangements for storage tanks of the floating roof type.

It is an object of the present invention to provide a new and improved storage tank having a floating roof construction.

It is another object of the present invention to provide a floating roof storage tank which provides a highly efficient vapor seal between the floating roof and the wall of the storage tank.

It is another object of the present invention to provide in a floating roof storage tank a pressure sealing arrangement wherein an effective vapor seal is obtained irrespective of wide dimensional variations between the floating roof and the wall of the tank.

It is a further object of the present invention to provide in a floating roof storage tank a pressure sealing arrangement for maintaining at a substantially constant level the pressure in an inflatable means located between the floating roof and the wall of the tank, irrespective of temperature variation.

It is yet another object of the present invention to provide in a floating roof storage tank a pressure sealing arrangement for maintaining within a predetermined range the pressure in a tube means located between the floating roof and the tank wall.

It is yet a further object of the present invention to provide in a storage tank a floating roof seal which is highly dependable, is self-sustaining in operation, and requires a minimum of maintenance.

The above and other objects are realized in accordance with the present invention by providing a new and improved pressure sealing arrangement for a storage tank of the floating roof type. Briefly, the pressure sealing arrangement operates to provide a vapor seal between the floating roof and the wall of the storage tank and, in this connection, the arrangement is carried by the floating roof as it moves vertically in the storage tank in response to changes in the level of the stored product. In one aspect of the present invention, the pressure within a tube means disposed between the floating roof and the tank wall is maintained at a substantially constant level, irrespective of wide changes in temperature. To assure that an adequate supply of gas is available to the seal, automatically operable means are provided to periodically supply additional gas to the tube means and to vent gas to the atmosphere when the gas pressure within the tube means exceeds a predetermined value. In another aspect of the present invention, the gas pressure in the tube means between the floating roof and the tank wall is maintained within a predetermined range. Hence, notwithstanding which aspect of the invention is used, the pressure within the tube is maintained at a value that assures an effective vapor seal—irrespective of the vertical position of the roof relative to the tank wall.

The invention, both as to its organization and method of operation, taken with further objects and advantages thereof, will best be understood by reference to the following description taken in connection with the accompanying drawings, in which:

FIG. 3 is an enlarged fragmentary cross-sectional view taken along the line 3—3 in FIG. 1, illustrating the tube means comprising a part of the pressure sealing arrangement of FIG. 1;

FIG. 4 is an enlarged fragmentary elevational view, shown partially in section, of the tube means of FIG. 3;

FIG. 5 is an enlarged fragmentary perspective view of a portion of the tube means of FIG. 3;

FIG. 6 is a diagrammatic view of the storage tank and pressure sealing arrangement of FIG. 1;

FIG. 7 is a perspective view of part of pressure sealing arrangement depicted in FIG. 6; and FIG. 8 is a cross-sectional view taken along line 8—8 in FIG. 7.

Figure 1:
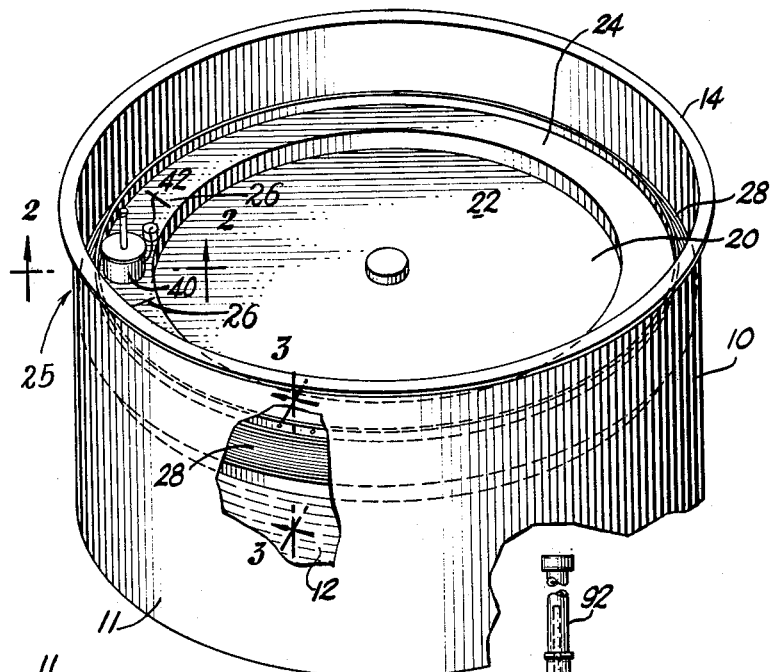
FIG. 1 is a fragmentary perspective view of a storage tank and a pressure sealing arrangement embodying the features of the present invention.

Referring now to the drawings and more particularly to FIG. 1, there is illustrated a storage tank 10 in which is stored liquid, for example, a petroleum product. The storage tank 10 is constructed on a suitable foundation imbedded in the earth or the like and comprises a vertical cylindrical wall 11 terminated at its upper end with a lip 14. The storage tank 10 is of the floating roof type and, in this connection, embodies a pontoon type floating roof 20 having a diameter slightly less than the diameter of the tank 10. The floating roof 20 includes a main deck 22 and an annular pontoon chamber 24 which imparts the necessary buoyancy to the roof 20 so that it floats on the product stored within the tank 10. As is well known, the floating roof 20 remains on the top of the stored liquid and moves vertically within the tank in accordance with the level of the stored liquid.

For the purpose of providing a vapor seal between the floating roof 20 and the tank wall 11, a new and improved pressure sealing arrangement 25 is supported by the floating roof 20. Briefly, the pressure sealing arrangement 25 comprises a tube means 28 supported from the rim of the roof for engagement with the inner wall of the tank 11. The tube means 28 is in fluid communication with a constant pressure means 27 that maintains the pressure within the tube means 28 at a substantially constant level. The constant pressure means 27 being suitably supported by the floating roof 20. An air replacement and venting means 29 is also provided to assure that periodically gas is supplied to the tube means 28 and to further assure that gas is vented to the atmosphere when the gas pressure within the tube means 28 exceeds a predetermined value.

Considering more specifically the floating roof 20, it moves vertically, as seen in FIG. 1, within the tank 10 and at all times floats on top of the stored product 12. By the use of the tube means 28, a vapor seal is obtained between the floating roof 20 and the tank wall 11, irrespective of the position of the roof within the tank 10. By this arrangement, the loss of the stored product 12, whether occurring through volatilization or through "wetting" or through "wicking" is minimized.

Figure 2:
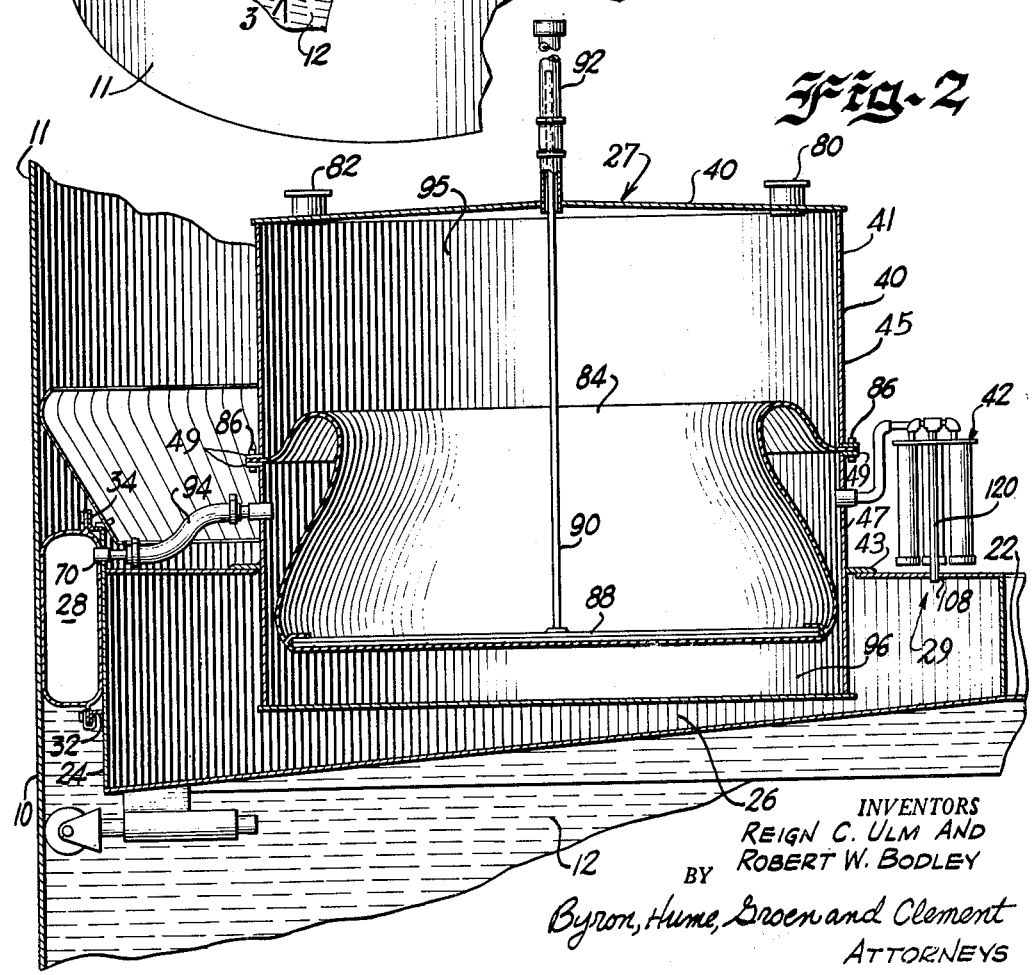
FIG. 2 is an enlarged fragmentary cross-sectional view, shown partially in elevation, taken along the line 2—2 in FIG. 1.

The roof 20 is circular and includes an inner main deck 22 composed of a suitably rigid material preferably of steel plate or the like. Surrounding the main deck 22 and extending around the periphery of the roof 20 is a pontoon chamber 24 which is elevated from the deck 22 and is constructed of suitable steel plate or the like. The pontoon chamber 24 is air tight to provide the necessary buoyancy for the roof and, as shown in FIG. 2, is in engagement with the top surface of the stored liquid 12. As is further shown in FIGS. 1 and 2, the diameter of the roof 20, defined primarily by the pontoon chamber 24, is somewhat less than the diameter of the tank wall 11, thereby accommodating disposition of the tube means 28 between the floating roof 20 and the tank wall 11.

Considering now in greater detail the tube means 28, attention is invited specifically to FIGS. 2 through 5. As shown, the tube means 28 extends entirely around the rim of the floating roof 20 and engages the entire inner periphery of the tank shell 11. To this end, the tube means 28 comprises a generally toroidal element which is maintained in an inflated condition with a suitable gas, for example, air or the like, by the constant pressure means 27. To provide a highly efficient vapor seal the tube means 28 is made of resilient material and, when inflated with air above atmospheric pressure, it tends to assume a torus shape having a generally circular cross section. However, because of the limited space available between the floating roof 20 and the tank wall 11, the tube means 28 when inflated assumes a generally oblong configuration, as best shown in FIGS. 2 and 3. It will be appreciated that the material used in the tube means 28 must be impervious to the product 12 stored in the tank 10 as well as the pressurized air used to inflate it. In addition, because the tube means 28 engages a substantial area of the tank wall 11 and, further, because the tube seal 28 must move vertically within the tank 10 yet maintain engagement with the wall 11, the material must be fairly rugged to withstand the scuffing and resistive forces offered by the tank wall 11.

More particularly, the tube means 28 comprises an outer covering 52 made of rugged, abrasive-proof material, for example, polyester coated nylon which has been suitably vulcanized. As shown in FIG. 5, the outer covering 52 comprises three separate pieces which are suitably connected to the rim of the floating roof 20 by flanges 50. Located within the outer covering 52 is an inner tube 66 made of vapor impervious material, for example, polyvinyl alcohol, of a predetermined thickness. The tube means 28 and in particular the inner tube 66 is inflated through opening 70 with air under the control of the constant pressure means 27 to approximately one ounce of pressure. It has been determined that a pressure of this type causes the tube seal 28 to assume the shape shown in FIGS. 2 and 3, and, specifically, causes the outer covering 52 to engage a substantial portion of the inner tank wall 11.

In order to assure that an effective vapor seal is maintained during vertical movement of the floating roof 20, the tube means 28 is supported from the rim of the floating roof 20 at spaced apart points. In this connection, the upper flanges 50 (see FIG. 5) of the outer covering 52 are suitably secured by fasteners or the like to an outwardly extending bracket 34 which is suitably welded to the upper part of the rim of the roof 20 so as to project outwardly around the roof 20, a portion of the bracket 34 extending upwardly to coact with the flanges 50. As shown, suitable openings 54 are provided in the flanges 50 of the outer covering 52 to accommodate fasteners 36 which coact with washers 56 and nuts 58. In a similar manner, the lower flanges 50 (see FIG. 5) are connected to an annular angle bracket 32, which is suitably welded to the lower part of the rim of the roof 20 so as to project outwardly around the roof 20, a portion of the bracket 32 extending downwardly to coact with the flanges 50. Actually, in contrast to the upper flanges 50, the lower flanges 50 coact with hold down clips 60, (see FIG. 4) which are secured by suitable fasteners 62 and associated nuts 46 and washers 48, coact with the downwardly extending portion of annular angle bracket 32. By the above described arrangement, the inner portion of the tube means 28 flexibly engages substantially all of the roof rim between the brackets 32 and 34, while the outer portion of the tube means 28 slidably engages a substantial area of the tank wall 11. Thus, notwithstanding the fact that the space between the roof 20 and the tank wall 11 varies as the roof 20 moves vertically or that the inner surface of the tank wall 11 is uneven because of welding seams and the like, the tube means 28 remains in engagement with substantial peripheral areas of both the roof rim and the tank wall 11, thereby providing an effective vapor seal.

It will be appreciated that if the tube means 28 is inflated with too low or too high a pressure, an effective vapor seal may not be provided as the tube means 28 moves along the uneven surface of the tank wall during vertical movement of the roof. If the pressure is too low, the tube means 28 does not engage the roof rim and the tank wall 11 with a force adequate to prevent vapor leakage. On the other hand, if the pressure is too high, the tube means 28 applies a force greater than is desired, with the result that excessive stresses are imparted to both the tube means 28 including the outer covering 52 and the inner tube 66 and the connections for the tube means 28 comprising the flanges 50, fasteners 36 and 62 and annular brackets 32 and 34. Hence, for optimum operation, it is desirable that a pressure of approximately one ounce per square inch be maintained in the tube means 28 irrespective of wide temperature ranges and, to this end, the constant pressure means 27 is employed.

The constant pressure means 27, shown in FIGS. 2 and 6, comprises an expansion chamber 40 in fluid communication with the tube means 28. The expansion chamber 40 comprises a completely enclosed vessel 41 having inspection ports 80 and 82 provided in its upper end. Actually, the vessel 41 is partially recessed into the pontoon chamber 24 and, to this end, an annular flange 43 extends radially outward of the wall of the vessel 41 and is suitably secured by welding or the like to the pontoon chamber 24 as shown in FIG. 2.

Specifically, the vessel 41 comprises two cup-shaped portions 45 and 47 provided with annular flanges 49 which coact to form a clamping ring 86 for a diaphragm 84. The diaphragm 84 is made of a resilient, air impervious material, for example, neoprene rubber, and has a configuration and size generally similar to the cup-shaped portions 45 and 47. As shown, the open end of the diaphragm member 84 is disposed between the annular clamp ring 86, thereby providing an upper chamber 95 defined by the upper cup-shaped portion 45 and the diaphragm 84 and, further, a lower chamber 96 defined by the lower cup-shaped portion 45 and the diaphragm 84. As shown, fluid communication is obtained between the lower chamber 96 and the tube means 28 by a suitable conduit 94 and associated fittings. The diaphragm 84, as described in greater detail hereinafter, moves vertically within the vessel 41 during normal operation and, according, the values of the chambers 95 and 96 vary in accordance with the position of the diaphragm 84. A steel plate 88 of disc-like construction having a diameter somewhat less than the diameter of the vessel 41, is suitably secured to the bottom of the diaphragm 84 and functions as a control weight for establishing a predetermined operating pressure for the expansion chamber 40, i.e. by establishing a designated pressure within the lower chamber 96. It should be appreciated that the weight of the plate 88 can be varied or that additional weights may be added to alter the operating pressure of the expansion chamber 40.

The diaphragm 84 in operation moves vertically within the vessel 41 in response to changes in temperature of the air in the tube means 28 and the lower chamber 96. Particularly, the diaphragm 84 moves between a collapsed position wherein the diaphragm 84 conforms to the cup-shaped portion 47, i.e. the steel plate 88 is adjacent to the bottom of the expansion chamber 40 and the wall of the diaphragm 84 is adjacent to the wall of the vessel 41, and an extended position wherein the diaphragm 84 conforms to the cup-shaped portion 45, i.e. the steel plate 88 is adjacent the top of the expansion chamber 40 and the wall of the diaphragm 84 is adjacent the wall of the vessel 41. In order to assure that the diaphragm 84 is maintained in the middle of the chamber 40 so as to permit proper folding and unfolding of the diaphragm 84, during its vertical movement, a guide rod 90 is attached at its lower end to the steel plate 88, the body of the guide rod 90 being receeived within a guide element 92 suitably secured to the top of the expansion chamber 40.

It will be appreciated that with a given quantity of air in the lower chamber 96, the diaphragm 84 assumes a position intermediate the top and bottom of the vessel 41. If the atmospheric temperature increases, thereby tending to cause an increase of pressure in the tube means 28, the conduit 94 and the lower chamber 96, the diaphragm 84 moves vertically to provide an additional volume, whereby the tendency toward increased pressure is abated and the pressure within the tube means 28 is maintained at the desired level. Conversely, if the atmospheric temperature decreases, thereby tending to decrease the pressure within the tube means 28, conduit and lower chamber 96 decreases, the diaphragm 84 moves downwardly thereby decreasing the available volume to maintain the pressure within the tube means 28 at the desired level. Hence, the diaphragm 84 moves vertically up and down within the vessel 41 in response to changes in atmospheric temperature and maintains substantially constant the pressure within the tube means 28. Thus, the expansion chamber 40 maintains an effective control over the pressure in the tube means 28 although, in a physical embodiment of the invention, its displacement capacity is only approximately 20% of the volume of the tube means 28.

While the constant pressure means 27 or expansion chamber 40 provides effective pressure regulation of the tube means 28 under varying temperature conditions, air is added to and vented from the expansion chamber 40 in order to assure its proper operation and, in this connection, an air replacement and venting means 42 is operatively associated with the constant pressure means 27 or expansion chamber 40. The air replacement and venting means 42 functions to admit air to the lower chamber 96 periodically under certain conditions and, further, functions to vent air from the lower chamber 96 when the air pressure in the tube means 28 and the lower chamber 96 exceeds a predetermined level.

Considering the air replacement and venting means 42 in greater detail, attention is invited to FIGS. 2, 6, 7, and 8. The air replacement and venting means 42 comprises a valving arrangement 100, 102 and 104 for controlling the flow of air into and out of the expansion chamber 40 and also comprises a sealed chamber 26 which contains a reservoir of air that is supplied to the expansion chamber 40 under certain conditions. As best shown in FIG. 7, the control valves 100, 102 and 104 are supported from a common plate 103 which is suitably attached to the upper part of the sealed chamber 26, while the sealed chamber 26 is located at the periphery of the floating roof 20 and is actually sealed off from the pontoon chamber 24. The valve arrangement 100, 102 and 104 is in fluid communication, respectively, with the expansion chamber 40, the sealed chamber 26, and the atmosphere as described below. Specifically, the valve 100 is a relief valve which operates to vent air from the tube seal 28 and expansion chamber 40 when the diaphragm 84 is in its fully extended position and the pressure in the tube means 28 is over a predetermined level. The valve 102 is an expansion chamber inlet valve and functions to permit air flow from the sealed chamber 26 into the expansion chamber 40 when the pressure in the sealed chamber exceeds the pressure in the expansion chamber 40 by a predetermined amount. The valve 104 is a sealed chamber inlet valve which permits air flow from the atmosphere to the sealed chamber 26 when the pressure within the sealed chamber 26 is less than the atmospheric pressure by a predetermined amount. The three valves 100, 102, and 104 are of the liquid type and comprise cylinders partially filled, as shown in FIGS. 6 and 7 with a liquid, such as, oil or the like. The height of the oil within the cylinders and the specific gravity of the oil determines the pressure differential at which each of the valves 100, 102, and 104 operates.

Assuming that it is desired to maintain within the tube means 28 a constant pressure of approximately 1 ounce per square inch of atmospheric pressure, a steel plate 88 having a weight adequate to condition the diaphragm 84 to produce the desired pressure is selected and embodied in the expansion chamber 40. Hence, when the temperature of the air in the tube means 28 increases, for example, during the heat of the day, the air pressure is actually maintained at 1 ounce per square inch by the increased volume provided by the expansion chamber 40. Of course, when the temperature increase is such that the diaphragm 84 assumes its fully extended position, the pressure within the expansion chamber 40 and, hence, the tube means 28, increases.

When the pressure in the expansion chamber 40 and the tube means 28 reaches a predetermined amount, for example, 2.5 ounces per square inch, the relief valve 100 operates to vent air from the tube means 28 and the lower chamber 96 of the expansion chamber 40. Specifically, as seen best in FIG. 6, air is vented from the lower chamber 96 to the atmosphere as follows: a conduit 110, a conduit 112, the liquid stored within the valve 100, the air space within the valve 100, the outlet conduit 111 to the atmosphere. Actually, the oil within the conduit 112 is pushed downwardly until the air bubbles through the oil contained in the valve 110, whereby the air passes out of the outlet conduit 111 to the atmosphere. By this arrangement, the air pressure within the tube means 28 at no time exceeds the designated amount, for example, 2.5 ounces per square inch with the result that irrespective of high temperature conditions, the sealing force developed by tube means 28 on the storage wall 11 does not increase beyond a tolerable amount and the lifetime of the tube means 28 is not unnecessarily reduced.

As indicated above, the sealed chamber 26 is also filled with air and, in this connection, means are provided for intermittently supplying air to the sealed chamber 26 from the atmosphere. More specifically, the sealed chamber inlet valve 104 is present to operate when the pressure within the sealed chamber 26 is less than the atmospheric pressure by a predetermined amount, for example ½ ounce per square inch. This condition may exist any time during the day or night but frequently occurs during the evening and night when the pressure in the sealed chamber 26 falls below atmospheric pressure because of the decrease in atmospheric temperature. In any event, when a suction or pressure differential exists in the sealed chamber 26, for example, ½ ounce per square inch with respect to atmospheric pressure, the inlet valve 104 operates and air passes from the atmosphere into the sealed chamber 26, as follows: the atmosphere, inlet conduit 114, the liquid stored in the valve 104, the air space within the valve 104, a conduit 116, a conduit 120, and the sealed chamber 26. Hence, air is automatically supplied to the sealed chamber 26 when certain conditions exist, thereby maintaining a reservoir of air in the sealed chamber 26.

Of course, when the atmospheric temperature increases, the pressure of the sealed chamber 26 increases. For example, if the pressure in the sealed chamber 26 increases to 2 ounces per square inch and the expansion chamber 40 has an operating pressure of 1 ounce per square inch (and the diaphragm 84 is in an intermediate position), the air in the sealed chamber 26 vents to the expansion chamber 40 under the control of the expansion chamber inlet valve 102, since the valve 102 is set to operate at a 1 ounce pressure differential. Specifically, air passes from the sealed chamber 26 through the conduit 120, a conduit 118, the liquid stored in the valve 102, the air space within the valve 102, a conduit 124, the conduit 110 and into the lower chamber 96 of the expansion chamber 40. Air does not pass through the valve 100 because it is set to operate only at a pressure differential of 2.5 ounces per square inch and not 2 ounces per square inch. Thus, because air is flowing from the sealed chamber 26 to the expansion chamber 40, the diaphragm 84 moves into its fully extended position and the pressure within the expansion chamber 40 and the tube means 28 increases to a value somewhat under 2.5 ounces.

It should be appreciated that once the expansion chamber 40 is in its fully expanded position that for all practical purposes a one-way fluid connection is obtained between the sealed chamber 26 and the expansion chamber 40. If, thereafter, the pressure within the sealed chamber 26 increases, the pressure within the expansion chamber 40 likewise increases . . . but, because of the valve 102 operating at a one ounce pressure differential, the pressure within the sealed chamber 26 remains one ounce per square inch higher than the pressure within the expansion chamber 40. When the pressure in the expansion chamber 40 exceeds 2.5 ounces, the relief valve 100 operates to vent air to the atmosphere from the expansion chamber 40. Hence, at no time is the pressure within the expansion chamber 40 permitted to exceed 2.5 ounces per square inch and the pressure within the sealed chamber 26 permitted to exceed 3.5 ounces per square inch.

In another aspect of the present invention, the constant pressure means 27 is eliminated from the pressure sealing arrangement 25 and the air replacement and venting means 42 is used exclusively with the tube means 28. The operation of the tube means without the expansion chamber 40 is substantially similar to the operation described above, with the exception that the pressure within the tube means is not maintained at a substantially constant value, for example, 1 ounce per square inch by the expansion chamber 40. On the contrary, the pressure within the tube means 28 continuously varies within a predetermined range as set by the operating limits of the air replacement and venting means 42. Of course, it should be appreciated that the settings of the relief valve 100 and the sealed chamber inlet valve 104 and the expansion chamber inlet valve 102 can be readily changed to provide a finer control over the pressure of the tube means 28.

From the foregoing description it should be appreciated that there has been provided a new and improved pressure sealing arrangement embodying a tube means adapted to provide an effective vapor seal between a floating roof and a tank wall. Notwithstanding variations in the distance between the floating roof and the tank shell produced by the lack of concentricity of the roof with the tank and by the uneven inner surface of the tank well resulting from welding and the like and from shifting of the tank foundations, an excellent vapor seal is obtained. The tube means is sensitive to pressure and is maintained in good sealing contact with the floating roof and the tank wall when it is inflated to only approximately 1 ounce per square inch. This relatively small pressure permits high flexibility of the tube means, good surface contact between the tube means and the roof and tank wall, and minimum abrasive action and wear of the tube means, with the result that the useful life of the tube seal is increased.

While several embodiments described herein are at present considered to be preferred, it is understood that various modifications and improvements may be made therein, and it is intended to cover in the appended claim all such modifications and improvements as fall within the true spirit and scope of the invention.

What is desired to be claimed and secured by Letters Patent of the United States is:

In a storage tank having a well for storing fluid products, a floating roof having a periphery less than the periphery of said tank and adapted to float on said fluid products, said floating roof having at least one pontoon for providing buoyancy thereto, a gas inflatable means disposed between the periphery of the roof and the wall of the storage tank and having a first connecting means, variable volume means for maintaining the pressure in said inflatable means at a substantially constant pressure irrespective of temperature change of said gas, said variable volume means including second and third connecting means, conduit means interconnecting said first and second connecting means for maintaining said inflatable means and variable volume means in direct fluid communication, a thermal pump means for supplying gas to said variable volume means and having a further connecting means, an integral valving means interconnecting said third connecting means, fourth connecting means and the atmosphere to automatically vent said inflatable means when the pressure within said inflatable means reaches a predetermined level and to automatically admit air into said thermal pump means when the pressure differential between the thermal pump means and the atmosphere reaches a predetermined amount, and to automatically admit air into said variable volume means from said thermal pump means when the pressure differential between said thermal pump means and said variable volume means reaches a predetermined value.

References Cited by the Examiner

UNITED STATES PATENTS

| | | | |
|---|---|---|---|
| 2,050,686 | 8/36 | Wiggins | 220—26 |
| 2,085,752 | 7/37 | Horton et al. | 220—26 |
| 2,538,875 | 1/51 | Laird | 220—26 |
| 2,847,142 | 8/58 | McClintock | 220—26 |
| 2,888,717 | 6/59 | Domitrovic | 220—26 |
| 2,968,420 | 1/61 | Harris et al. | 220—26 |
| 2,981,437 | 4/61 | Wissmiller | 220—26 |
| 3,002,828 | 10/61 | Fino et al. | 220—26 X |
| 3,059,805 | 10/62 | Joor | 220—26 |
| 3,120,320 | 2/64 | Wissmiller | 220—26 |

THERON E. CONDON, *Primary Examiner.*

EARLE J. DRUMMOND, FRANKLIN T. GARRETT, *Examiners.*